(12) United States Patent
Nabar et al.

(10) Patent No.: US 8,179,315 B1
(45) Date of Patent: May 15, 2012

(54) ITERATIVE TECHNIQUE FOR FAST COMPUTATION OF TXBF STEERING WEIGHTS

(75) Inventors: Rohit U. Nabar, Santa Clara, CA (US); Hongyuan Zhang, Fremont, CA (US); Sudhir Srinivasa, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 2 days.

(21) Appl. No.: 12/903,523

(22) Filed: Oct. 13, 2010

Related U.S. Application Data

(60) Provisional application No. 61/252,605, filed on Oct. 16, 2009, provisional application No. 61/294,418, filed on Jan. 12, 2010.

(51) Int. Cl.
*H01Q 3/00* (2006.01)

(52) U.S. Cl. ........................................ 342/377

(58) Field of Classification Search ................. 342/377
See application file for complete search history.

(56) References Cited

U.S. PATENT DOCUMENTS

| | | | | |
|---|---|---|---|---|
| 2006/0068718 | A1* | 3/2006 | Li et al. | 455/69 |
| 2007/0064687 | A1* | 3/2007 | Nakao | 370/358 |
| 2007/0160011 | A1* | 7/2007 | Kim et al. | 370/332 |

* cited by examiner

*Primary Examiner* — Thomas Tarcza
*Assistant Examiner* — Frank J McGue

(57) ABSTRACT

Systems and methods are provided for directing radiated energy from a transmitting device towards a receiving device using multiple antennas. Channel weights, representing signal attenuation and a phase rotation induced by a transmission medium, are determined at a transmitting device. A set of steering weights are determined based on applying an iterative linear transform to an initial value of the steering weights, where the linear transform depends on the determined channel weights. A final value of the steering weights is applied to an input signal to produce a transmit signal, and the transmit signal is transmitted using multiple antennas.

20 Claims, 7 Drawing Sheets

ITERATIVE TECHNIQUE FOR FAST COMPUTATION OF TXBF STEERING WEIGHTS

CROSS REFERENCE TO RELATED APPLICATION

This disclosure claims the benefit of U.S. Provisional Application No. 61/252,605, filed Oct. 16, 2009, and 61/294,418, filed on Jan. 12, 2010, each of which is incorporated herein by reference in its respective entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The present disclosure is directed to methods and apparatus for increasing the signal-to-noise ratio (SNR) and signal-to-interference ratio (SIR) of a received signal in a multi-stream communications system at a low level of computational complexity. In one embodiment, the present disclosure relates to directing a beam towards a receiving device (e.g., beam-forming), and more particularly, to performing beam-forming by efficiently designing a steering matrix.

Traditionally, a transmitting device receives or computes a channel matrix corresponding to noise and interference caused by unintended source signals and equipment noise between the transmitting device and a receiving device. The transmitting device computes a singular value decomposition (SVD) of the channel matrix, and generates a steering matrix to implement beam-forming transmission. Although these mechanisms are effective at increasing SNR and SIR, such mechanisms are computationally inefficient and may prematurely drain batter power, make device miniaturization difficult, and/or increase the cost or size of the transmitting device.

SUMMARY

In accordance with an embodiment of the invention, a transmitting device is provided for directing radiated energy towards a receiving device using multiple-antennas. A set of channel weights are determined that are representative of a signal attenuation and a phase rotation induced by a transmission medium. A set of steering weights is determined using the set of channel weights and by applying iterative techniques to an initial value of the steering weights. A signal is formed based from an input signal and the set of steering weights, and is transmitted using multiple antennas.

Further features of the invention, its nature and various advantages, will be more apparent from the accompanying drawings and the following detailed description of preferred embodiments.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

This disclosure generally relates to an efficient determination of steering weights in a transmission or reception system. The techniques described herein are applicable to beam-forming transmission, as well as to other transmission and reception techniques in which an efficient matrix decomposition is determined. For illustrative purposes, this disclosure is described in the context of a cellular multiple-input multiple-output (MIMO) system with a transmitter and receiver (e.g., a cellular phone transmitter and a base station receiver). However, the techniques described herein are applicable any transmitter, receiver, or other device that computes matrix decompositions using SVD-based determinations, including devices implementing a WiMAX, 802.11n, Bluetooth and/or 3GPP LTE standard.

MIMO systems may be used to improve link reliability and throughput by exploiting spatial, temporal, and frequency diversity. In cellular systems, beam-forming may improve MIMO system performance by focusing transmitted energy towards a receiving device (e.g., a base station), which may increase the received signal power, and hence the received SNR and/or SIR.

Figure 1:
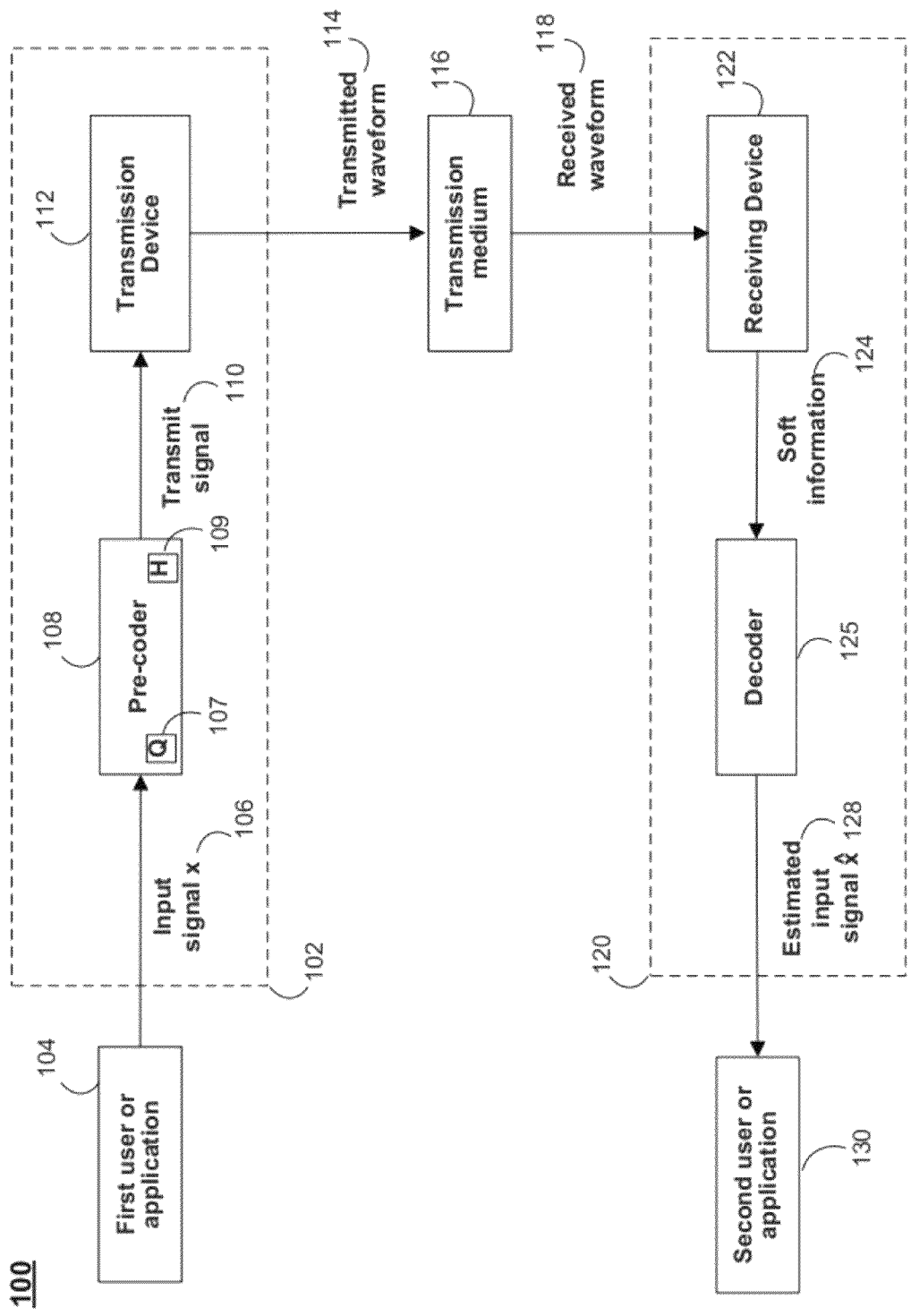
FIG. 1 shows an illustrative MIMO communications system in accordance with some embodiments of the present disclosure.

FIG. 1 shows an illustrative MIMO communications system 100 in accordance with some embodiments of the present disclosure. Communications system 100 uses transmitter 102 to communicate radiated energy over transmission medium 116 to receiver 120. First user or application 104 may produce a data stream, i.e., a stream of data symbols, that is to be transmitted to second user or application 130. First user or application 104 may correspond to a single communications entity or to multiple communications entities. For example, first user or application 104 may correspond to a software program in a computer system. The data stream produced by first user or application 104 may represent a sequence of symbol values that have been pre-processed by a source encoder (not shown). The data stream may correspond to voice information, video information, financial information, or any other type of information that can be represented in digital form.

Symbols in the data stream produced by first user or application 104 may be grouped together into a block of a fixed length to create input signal x 106, where input signal x 106 represents symbols that are to be transmitted by transmission device 112 during one symbol interval. In an embodiment, transmission device 112 uses $M_T$ transmit antennas to simultaneously transmit each of $N_{ss}$ symbols, where $N_{ss}$ represents a number of spatial streams.

Input signal x 106 may be input to pre-coder 108, where pre-coder 108 generates steering matrix Q 107 for use in beam-forming based on channel weights obtained in a channel matrix H 109. In an embodiment, steering matrix Q 107 represents an orthogonal matrix obtained by performing a SVD or other matrix decomposition on a matrix related to transmission medium 116. For example, steering matrix Q 107 may represent an orthogonal matrix obtained by performing a SVD on the matrix quantity $R=H^H H$ where superscript H denotes the matrix Hermitian.

Once pre-coder 108 obtains steering matrix Q 107, pre-coder 108 may premultiply input signal x 106 by steering matrix Q 107 to obtain transmit signal 110, which has a length of $M_T$ symbols. Each symbols in transmit signal 110 may belong to signal constellation based on the expected SNR at a receiver, and/or, based on preamplifier specifications. For example, each symbol in transmit signal 110 may correspond to an analog Binary Phase-Shift Keying (BPSK) signal, analog Phase-Shift Keying (PSK) signal, analog Frequency-Shift Keying (FSK) signal, analog Quadrature Amplitude Modulation (QAM) signal, or any other suitable analog or digital signal.

Transmit signal 110 is transmitted from transmission device 112 which includes $M_T$ transmit antennas. In an embodiment, the $M_T$ transmit antennas are aligned in a geometric pattern in order to maximize spatial and frequency diversity across the $M_T$ transmissions per symbol interval (where each transmission is performed on one of the $M_T$ transmit antennas of transmission device 112). Additionally or alternatively, the $M_T$ transmit antennas of transmission device 112 may be aligned to maximize the opportunity for beam-forming transmission. For example, the $M_T$ transmit antennas of transmission device 112 may be placed in a linear array or in any other suitable geometric configuration so as to maximize the constructive overlap of energy in transmitted waveform 114, where transmitted waveform 114 represents the radiated energy from the $M_T$ transmit antennas of transmission device 112 as the radiated energy passes through transmission medium 116.

Transmission medium 116 refers to the physical medium through which transmitted waveform 114 passes before being recovered at receiving device 122. Various characteristics of transmission medium 116, also referred to as the "channel," may corrupt data that is communicated or stored thereon, and as such, the information received over transmission medium 116 may be different from the original information originally transmitted from transmission device 112 as transmitted waveform 114. Thus, received waveform 118 may not be an exact replica of transmitted waveform 114, but rather, may be a corrupted version of transmitted waveform 114. Received waveform 118 may be processed by receiving device 122 to produce soft information 124. The processing employed by receiving device 122 may include, for example, frequency filters, multiplication and integration by periodic functions, and/or any other suitable demodulation technique corresponding to the type of modulation used by transmission device 112.

Decoder 125 may be used to correct and/or detect errors that occur due to transmission through transmission medium 116. After performing decoding, decoder 125 outputs an estimate of input signal x 106, referred to as estimated input signal x̂ 128. Decoder 125 may use any of a number of possible decoding algorithms to produce estimated input signal x̂ 128. For example, decoder 125 may use one of many iterative decoding algorithms known as belief propagation algorithms to decode soft information 124 into estimated input signal x̂ 128.

Estimated input signal x̂ 128 is delivered to second user or application 130. If decoder 125 correctly identifies and corrects errors that were present after transmission through transmission medium 116, estimated input signal x̂ 128 is a replica of input signal x 106. Otherwise, estimated input signal x̂ 128 may differ from input signal x 106.

In general, beam-forming with multiple transmit antennas can be achieved by varying the gain (e.g., magnitude and phase) of each antenna. Varying the antenna gains may affect the direction, width and power of the beam.

Figure 2:
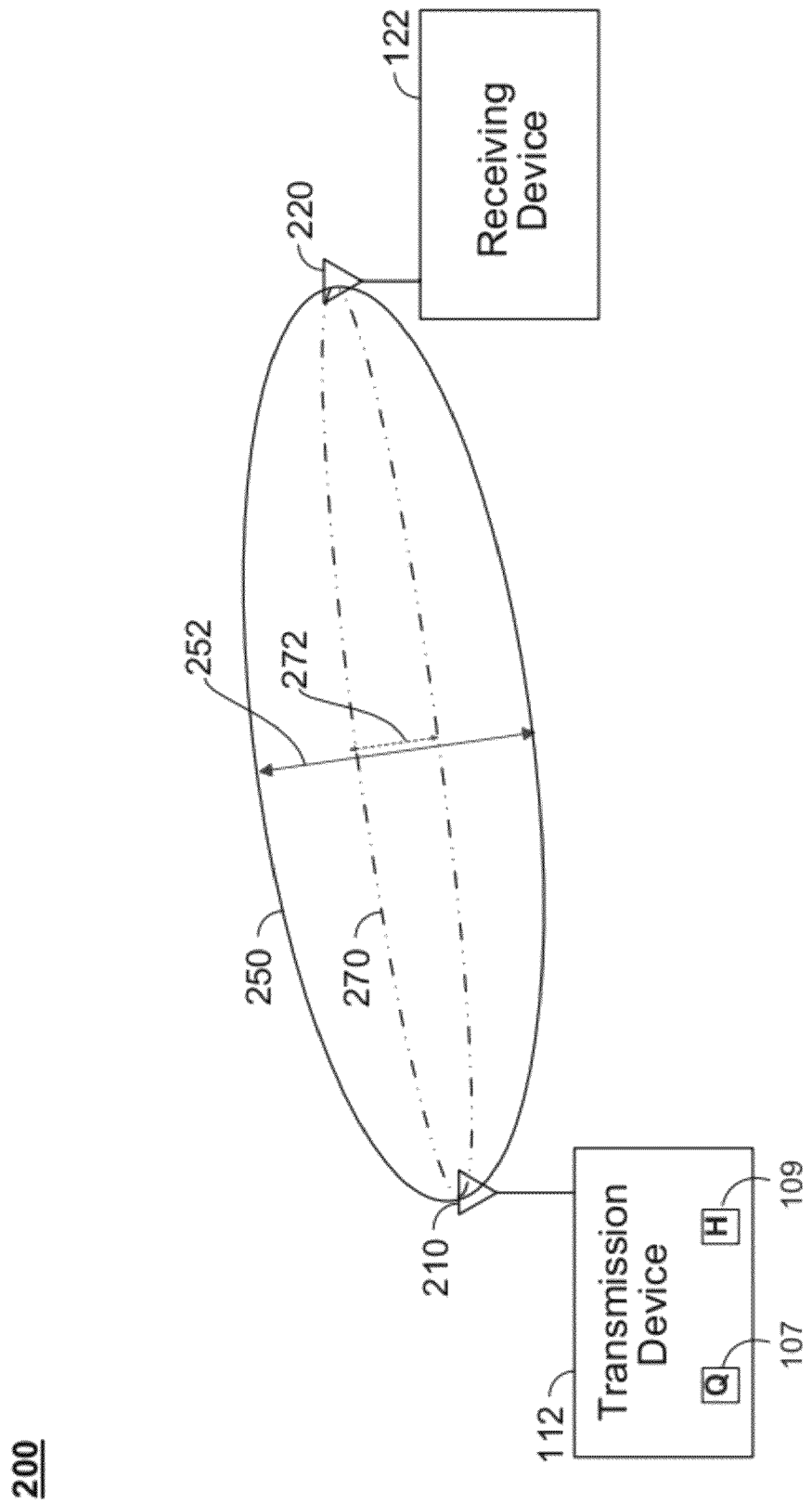
FIG. 2 is a diagram of an illustrative beam-forming system in accordance with some embodiments of the present disclosure.

FIG. 2 is a diagram of an illustrative beam-forming system 200 in accordance with some embodiments of the present disclosure. Beam-forming system 200 includes transmission device 112 and receiving device 122. Transmission device 112 (i.e., the beam-former) may be a mobile device in a cellular environment that provides and receives data to/from receiving device 122.

Transmission device 112 may use antennas 210 to shape the pattern of transmitted radiation in a way that increases the signal energy and signal quality at antennas 220 of receiving device 122. Processing circuitry (not shown) within transmission device 112 may modify characteristics of inputs signals to shape the pattern of transmitted radiation in a desirable way. The processing circuitry may create a desirable radiation pattern by controlling the phase and amplitude of each signal transmitted from antennas 210 in order to create an overall desirable pattern of constructive and destructive radiated energy.

Transmission device 112 may use pre-coding and/or antennas 210 to adjust the phase and relative amplitude of a transmitted signal, e.g., transmitted waveform 114 (FIG. 1), in order to create a pattern of constructive and destructive interference in the wavefront of the transmitted signal. This pattern of constructive and destructive interference shapes the radiation pattern formed by the combination of the waves from the antennas of antennas 210 and points the beam towards antennas 220 of receiving device 122.

Transmission device 112 may generate a beam 250 using antennas 210. Beam 250 represents a simplified radiated energy pattern that is emitted from transmission device 112 in the absence of beam-forming. As an approximation, beam 250 may have a minor axis width 252. In general, it is desirable to make the width 252 narrow in order to direct the energy of the beam towards desired receiver. However, there is a limit to how narrow a beam width can be made because the beam width depends on the number of antennas, the antenna configuration, and the type of pre-coding or other processing used in transmission device 112. In addition, as a beam width is made narrower, the beam becomes more likely to misalign with its target, i.e., antennas 220 of receiving device 122, and this could decrease, rather than increase, the SNR and SIR.

Receiving device 122 may be a base station, a cellular phone, PDA, mobile device, laptop, computing device, or any other suitable device used for communicating with a transmission device 112. Receiving device 122 may have one or more antennas, i.e., antennas 220, for receiving beam 250.

Transmission device 112 may modify the shape of beam 250, i.e., may perform a type of beam-forming, using steering matrix Q 107. Steering matrix Q 107 may be determined based on the value of a channel (e.g., as represented by a set of determined channel weights) between transmission device 112 and receiving device 122. Transmission device 112 may determine channel weights based on sounding, pilot, and/or training signal techniques.

In an embodiment, transmission device 112 may use steering matrix Q 107 to narrow the width and/or modify other characteristics of beam 250 to focus radiated energy towards antennas 220 of receiving device 122, and hence, increase the SNR and SIR at antennas 220. For example, transmission device 112 may use steering matrix Q 107 to narrow the width and/or other characteristics of beam 250 to beam 270. In particular, beam 270 has a reduced minor axis width, width 272, compared to width 252 of beam 250. As a consequence, beam 270 may impart more received signal energy to receiving device 122 than would be received using beam 250, thereby increasing the SNR and SIR of a received signal, for example, received waveform 118 (FIG. 1), at receiving device 122.

Figure 3:
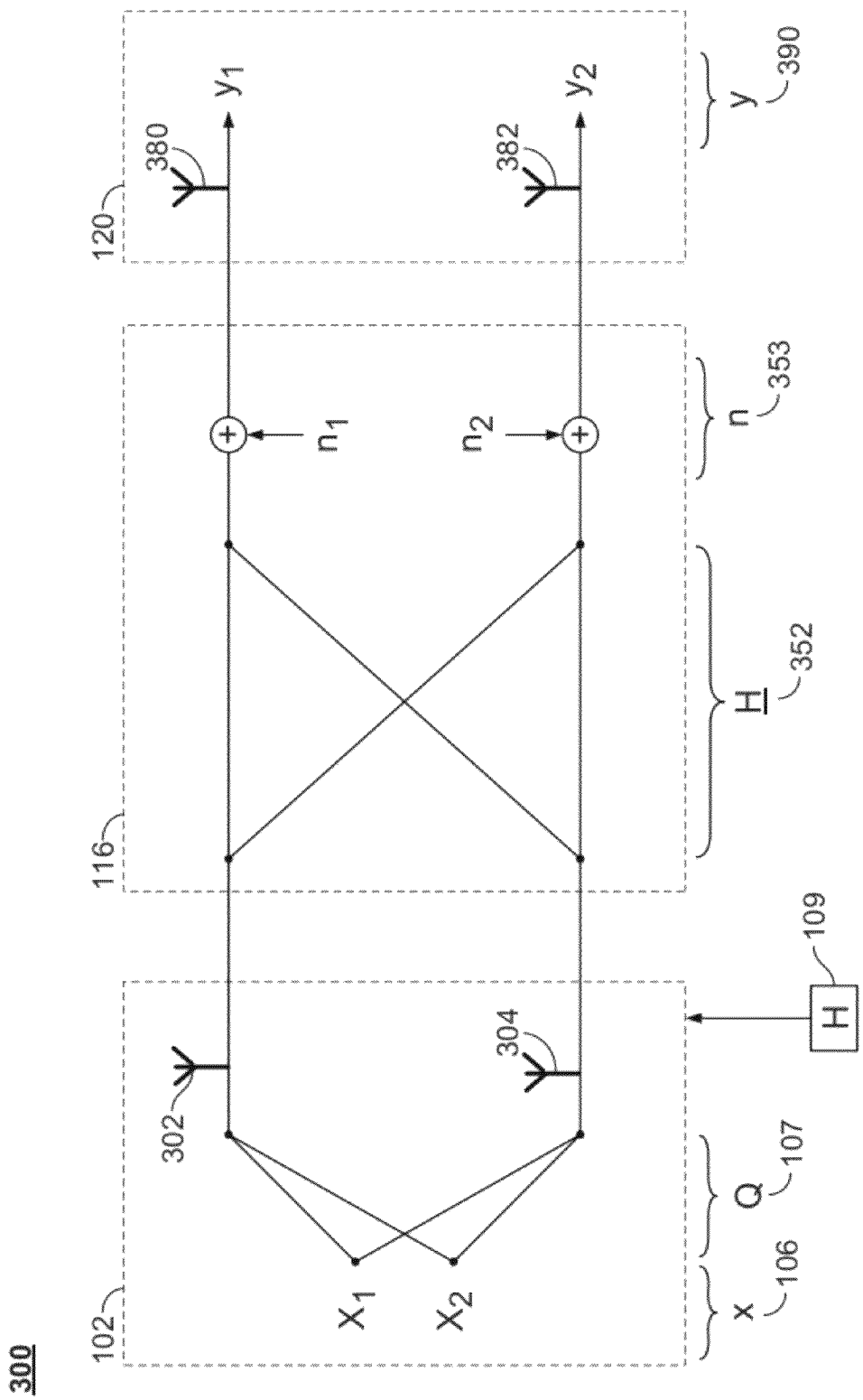
FIG. 3 is a diagram of an illustrative MIMO beam-forming system in accordance with some embodiments of the present disclosure.

FIG. 3 is a diagram of an illustrative MIMO beam-forming system 300 in accordance with some embodiments of the present disclosure. In communications system 300, transmitter 102 and receiver 120 each employ two antennas, and communicate over transmission medium 116. Transmitter 102 may transmit multiple spatial streams on antennas 302 and 304. In an embodiment, transmitter 102 transmits a different linear combination of the two spatial streams on each of antenna 302 and 304. In an alternative embodiment, transmitter 102 transmits two spatial streams, but transmits only a single spatial stream on each of antenna 302 and 304. In either case, input signal x 106 is a length-2 vector containing symbols $x_1$ and $x_2$.

Transmitter 102 may apply a pre-coding to input signal x 106 prior to transmission of input symbol x 106 on antennas 302 and 304. In an embodiment, transmitter 102 determines steering matrix Q 107 based on channel matrix 109, which contains information on channel weights corresponding to transmission medium 116. In this embodiment, transmitter 102 pre-codes input signal x 106 by matrix multiplying input signal x 106 by steering matrix Q 107.

Transmitter 102 may use steering matrix Q 107 to perform beam-forming prior to transmission of input signal x 106 on antennas 302 and 304. In particular, transmitter 102 may determine Q 107 based on exact or approximate knowledge of transmission medium 116. In an embodiment, transmitter 102 obtains knowledge of the relevant properties of transmission medium 116 by obtaining actual or estimated values of fading coefficients from fading matrix H 352, for which the $(i,j)^{th}$ element represents the attenuation and phase rotation of a signal transmitted from the $i^{th}$ transmit antenna to the $j^{th}$ receive antenna. Transmitter 102 stores these actual or estimated values in channel matrix H 109, where the elements of channel matrix H 109 are referred to as channel weights.

As mentioned above, transmitter 102 forms channel matrix H 109, which may represent either exact or estimated values of fading matrix H 352. In the latter case, transmitter 102 may use any known channel determination or estimation technique to determine channel weights. For example, transmitter 102 may use minimum-mean square estimation systems, maximum-likelihood estimations system, or any other suitable type of estimation systems and/or techniques. Additionally or alternatively to these channel determination and estimation techniques, transmitter 102 may employ channel sounding systems, training or pilot placement systems, and/or channel feedback systems that transfer information from receiver 120 to transmitter 102 in order to generate the values of the channel weights in channel matrix H 109.

Transmission medium 116 may include various sources of noise, interference, and/or corruption between transmitter 102 and receiver 120. Fading matrix H 352 corresponding represents channel fading and/or various corruptive effects in transmission medium 116 that occur due to scattering, relative movement of transmitter 102 and receiver 120, and/or other environmental effects. In an embodiment, transmission medium 116 represents a wireless fading channel that may be either zero-mean or non-zero mean. In this case, the elements of fading matrix H 352 may be circularly symmetric Gaussian random variables that are either correlated or independent from each other.

Noise n 353 represents additive or other non-linear forms of noise. In an embodiment, noise n 353 may be modeled as Additive White Gaussian Noise (AWGN). Further, noise n 353 may include interference from other sources, including electrical interference or circuitry noise picked up by antennas 380 and 382 of receiver 120. Noise n 353 may include noise sample $n_1$, corresponding to noise received at antenna 380, and noise sample $n_2$, corresponding to noise received at antenna 382. In an embodiment, each of noise sample $n_1$ and $n_2$ is a zero-mean Gaussian noise sample that is independent of the other and independent and identically distributed across symbol intervals. Receiver 120 may include various communication circuitry to de-modulate and decode the information received through transmission medium 116.

Receiver 120 may receive the signal transmitted by transmitter 102 by receiving a signal corresponding to the first signal stream on antenna 380 and a signal corresponding to the second signal stream on antenna 382. Because of the corruptive effects of transmission medium 116, received signal y 390 is not an exact replica of input signal x 106, but rather, is a corrupted or otherwise altered version of input signal x 106. Received signal y 390 may be demodulated to produce hard or soft-information using, for example, frequency filters, multiplication and integration by periodic functions, and/or any other suitable demodulation technique. From this demodulated information, receiver 120 may attempt to construct estimated input signal x 128. Received signal y 390 may include received symbol $y_1$ and received symbol $y_2$, on antenna 380 and antenna 382, respectively, in a given symbol interval period.

It should be understood, based on the disclosure and teachings provided herein that, although FIG. 3 depicts only two spatial streams, two transmit antennas, and two receive antennas, the techniques described herein readily apply to any number of spatial streams, transmit antennas, and receive antennas where the number of spatial streams is less than or equal to the number of transit antennas and less than or equal to the number of receive antennas. For example, the techniques described in the present disclosure apply to 3, 4, 10, and 50 spatial streams, and/or 3, 4, 10, and 50 transmit antennas, and/or 3, 4, 10, and 50 receive antennas when the number of spatial streams is less than or equal to the number of transit antennas and less than or equal to the number of receive antennas.

It should be further understood, based on the disclosure and teachings provided herein, that if the number of spatial streams is $N_{ss}$, the number transmit antennas 210 (FIG. 2) is $M_T$, and the number of receive antennas 220 (FIG. 2) is $M_R$, then input signal x 106 is of size $N_{ss} \times 1$, steering matrix Q 107 is of size $M_T \times N_{ss}$, channel matrix H 109 and fading matrix H 352 are of size $M_R \times M_T$, received signal y 390 is of size $M_R \times 1$, and noise n 353 is of size $M_R \times 1$. Further, a suitable model for representing the relationship between input signal x 106 and received signal y 390 is provided by the following matrix equation $$y = HQx + n.$$

Figure 4:
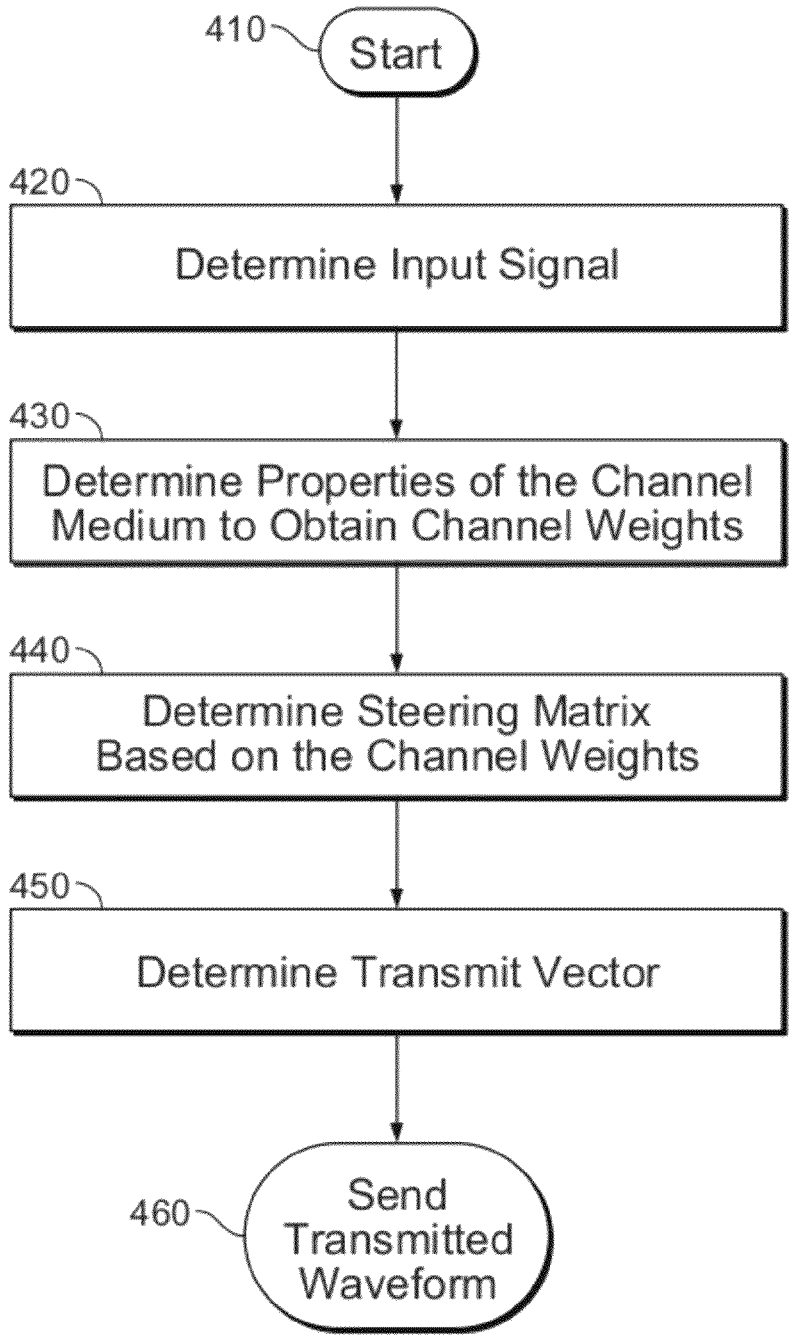
FIG. 4 is an illustrative flowchart for generating and transmitting a beam-formed signal from a multi-antenna wireless communications transmitter in accordance with some embodiments of the present disclosure.

FIG. 4 is an illustrative flowchart for generating and transmitting a beam-formed signal from a multi-antenna wireless communications transmitter, for example, transmitter 102 (FIGS. 1 and 3), in accordance with some embodiments of the present disclosure. At 410, process 400 may begin. At 420, an input signal is determined. For example, input signal x 106 (FIGS. 1 and 3) may be determined at 420. In an embodiment, input signal x 106 (FIGS. 1 and 3) is received as the output from hardware circuitry or from a program in a computer system. Input signal x 106 (FIGS. 1 and 3) may represent, for example, voice information, video information, financial information, or any other type of information that can be represented in digital form. Additionally, input signal x 106 (FIGS. 1 and 3) may represent the output of a software or hardware circuitry after source encoding has been performed. For example, a source coding technique that seeks to maximize entropy, either in a lossless or lossy form, may be applied to an input stream of data to produce input signal x 106 (FIGS. 1 and 3).

At 430, an estimate of the transmission medium, for example, transmission medium 116 (FIGS. 1 and 3), may be made or otherwise obtained, and corresponding channel weights determined. For example, at 430, transmitter 102 (FIGS. 1 and 3) may determine channel matrix H 109 (FIGS. 1-3) as an estimate of fading matrix H 352, where the elements of channel matrix $\underline{H}$ 109 (FIGS. 1-3) correspond to channel weights.

Transmitter 102 (FIGS. 1 and 3) may determine channel weights based on sounding, pilot, and/or training signal techniques. In an embodiment, transmitter 102 (FIGS. 1 and 3) may compute channel weights periodically, and use the same set of channel weights for several symbols durations before re-determining the channel weights. In this scheme, the frequency with which transmitter 102 (FIGS. 1 and 3) determines channel weights may depend on the time-variation of the channel. If the channel is rapidly time-varying, then the channel weights would be determined more frequently than if the channel is slowly varying. In an embodiment, transmitter 102 (FIGS. 1 and 3) may use interpolation or other predictive methods to estimate the time-variation in the channel weights in symbol periods that occur between true channel estimates.

At 440, transmitter 102 (FIGS. 1 and 3) may determine a beam-forming steering matrix based on the channel weights. For example, transmitter 102 (FIGS. 1 and 3) may arrange channel weights into a matrix form and perform a matrix decomposition of a function of the matrix form to determine a beam-forming steering matrix. In an embodiment, transmitter 102 (FIGS. 1 and 3) employs pre-coder 108 (FIG. 1) to form the matrix $R=H^H H$. Pre-coder 108 (FIG. 1) then forms a SVD of the R matrix to obtain steering matrix Q 107 (FIGS. 1-3). In an embodiment, pre-coder 108 (FIG. 1) decomposes the R matrix to be of the form $$R=V\Sigma V^H,$$

where $V=[v_1 \ldots v_{M_T}]$ is a $M_T \times M_T$ orthonormal matrix having columns $v_i$ (for $i=1, \ldots, M_T$) and selects steering matrix to be $Q=[v_1 \ldots v_{N_{ss}}]$, where the $N_{ss}$ columns of steering matrix Q 107 (FIGS. 1-3) are equal to the $N_{ss}$ columns of the V matrix that correspond to non-zero eigenvalues. Alternatively, pre-coder 108 (FIG. 1) may not directly perform computation of the SVD of the R matrix, but rather, may use iterative techniques to approximate the V matrix from the SVD, as explained in more detail in relation to process 500 (FIG. 5).

At 450, transmitter 102 (FIGS. 1 and 3) may determine transmit signal 110 (FIG. 1) based on the channel weights, arranged in matrix form as channel matrix 109 (FIGS. 1-3), input signal x 106 (FIGS. 1 and 3), and steering matrix Q 107 (FIGS. 1-3). In an embodiment, transmit signal 110 (FIG. 1) may be generated by computing the matrix product=Q x. The transmit vector may be determined using matrix multiplication circuitry and/or software, or may be performed through a series of purely scalar operations.

At 460, transmit signal 110 (FIG. 1) may be converted to transmitted waveform 114 (FIG. 1) and sent by transmission device 112 (FIGS. 1 and 2) over transmission medium 116 (FIG. 1). Transmission device 112 (FIGS. 1 and 2) may send transmitted waveform 114 (FIG. 1) using antennas 210 (FIG. 2) and/or antennas 302 and 304 (both of FIG. 3). Transmission device 112 (FIGS. 1 and 2) may convert transmit signal 110 (FIG. 1) to transmitted waveform 114 (FIG. 1) by amplifying, warping, or otherwise pulse-shaping transmit signal 110 (FIG. 1). For example, transmission device 112 (FIGS. 1 and 2) may apply a raised cosine filter, a root-raised cosine filter, and/or any other suitable pulse-shaping filter to transmit signal 110 (FIG. 1) to convert transmit signal 110 (FIG. 1) into transmitted waveform 114 (FIG. 1), which is suitable for sending over transmission medium 116 (FIG. 1).

Figure 5:
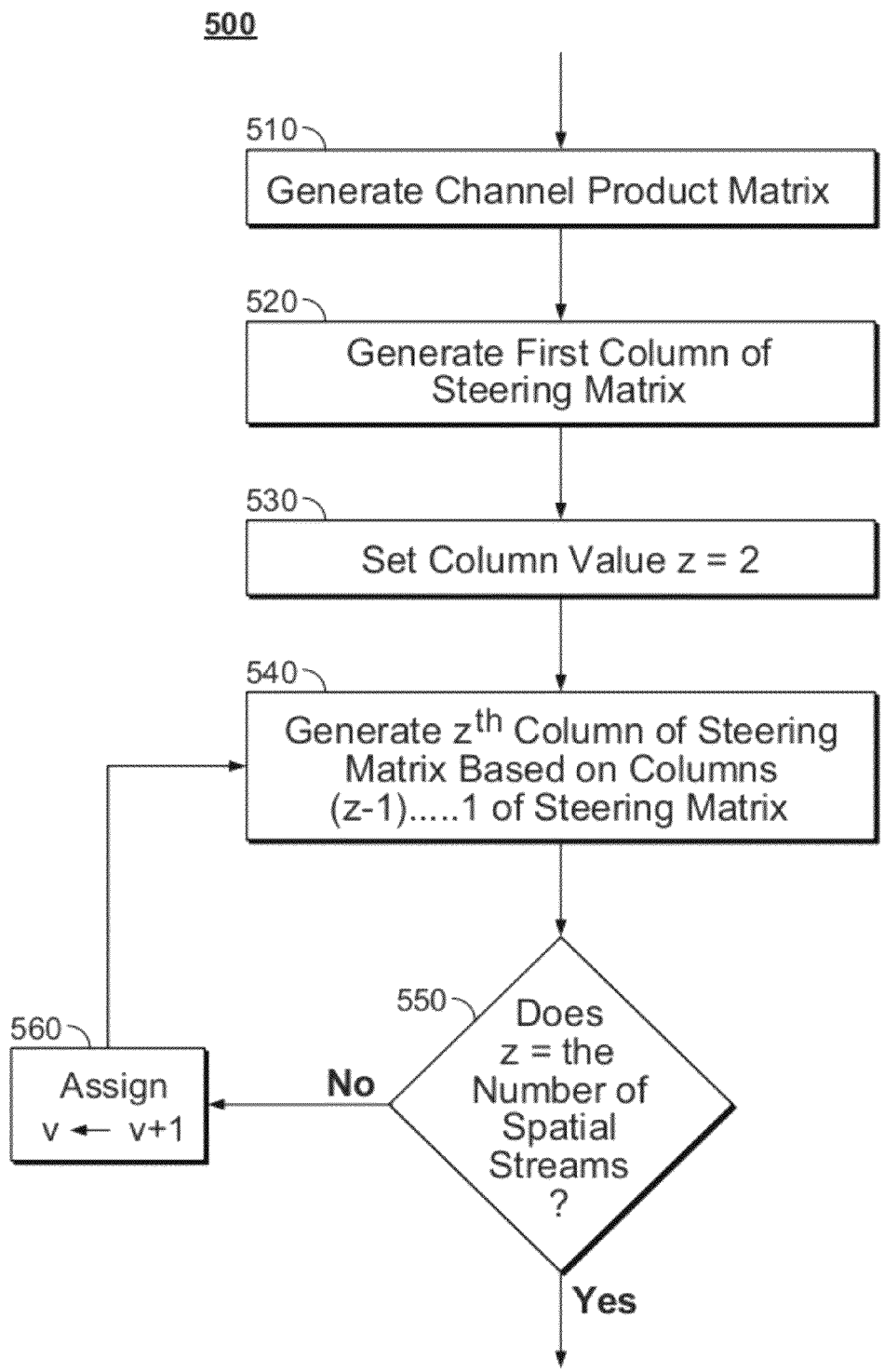
FIG. 5 illustrates a process for determining a beam-forming steering matrix in accordance with some embodiments of the present disclosure.

FIG. 5 illustrates a process for determining a beam-forming steering matrix in accordance with some embodiments of the present disclosure. Process 500 may be implemented at 440 of process 400 (both of FIG. 4). At 510, process 500 generates a channel product matrix. To generate the channel product matrix, process 500 may first obtain channel weights, for example, at 430 of process 400 (both of FIG. 4), to form channel matrix H 109 (FIGS. 1-3). Process 500 at 510 may then form the matrix product $R=H^H H$ using any suitable type of processing and storage software, device, or circuitry. Alternatively, process 500 at 510 may generate channel product matrix using any other suitable technique.

In an embodiment, steering matrix Q 107 (FIGS. 1-3) is of the form $$Q=[v_1\, v_2 \ldots v_{N_{ss}}],$$

where $v_1$ is the first column of the steering matrix, and wherein $v_k$ is a $M_T \times 1$ vector for $1 \leq k \leq N_{ss}$. At 520, process 500 generates the first column of steering matrix Q 107 (FIGS. 1-3). At 520, process 500 may generate $v_1$ to be a unit-vector, normalized to have unit energy, i.e., $$v_1=[1, 1, \ldots 1]/\sqrt{M_T}.$$

Figure 6:
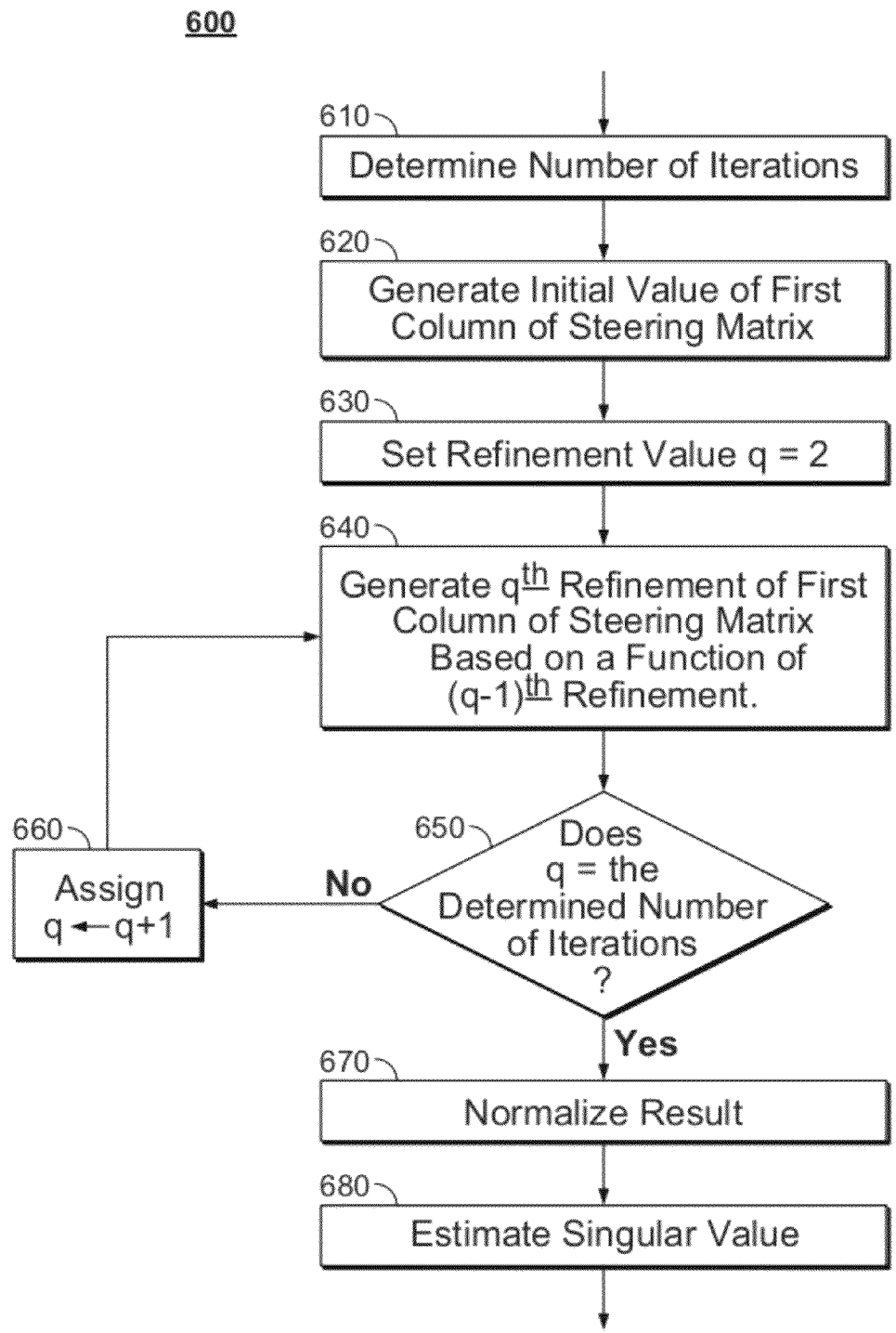
FIG. 6 illustrates an iterative process for determining a first column of a beam-forming steering matrix in accordance with some embodiments of the present disclosure.

Alternatively, process 500 may choose any other suitable initial value for $v_1$. Alternatively or additionally, process 500 may determine $v_1$ through an iterative process. In this case, an initial value for $v_1$ may be determined as described above (i.e., $v_1$ may initially be set to be a unit-vector, normalized to have unit energy), and then the value of $v_1$ may be refined through successive iterations. For example, $v_1$ may be determined through an iterative process determined similarly or identically to process 600 (FIG. 6).

At 530, process 500 may set a column value, z, equal to the value 2. The column value be computed and stored in hardware and/or software. The column value reflects the number of columns of steering matrix Q 107 (FIGS. 1-3) that have been computed during the operation of process 500.

Figure 7:
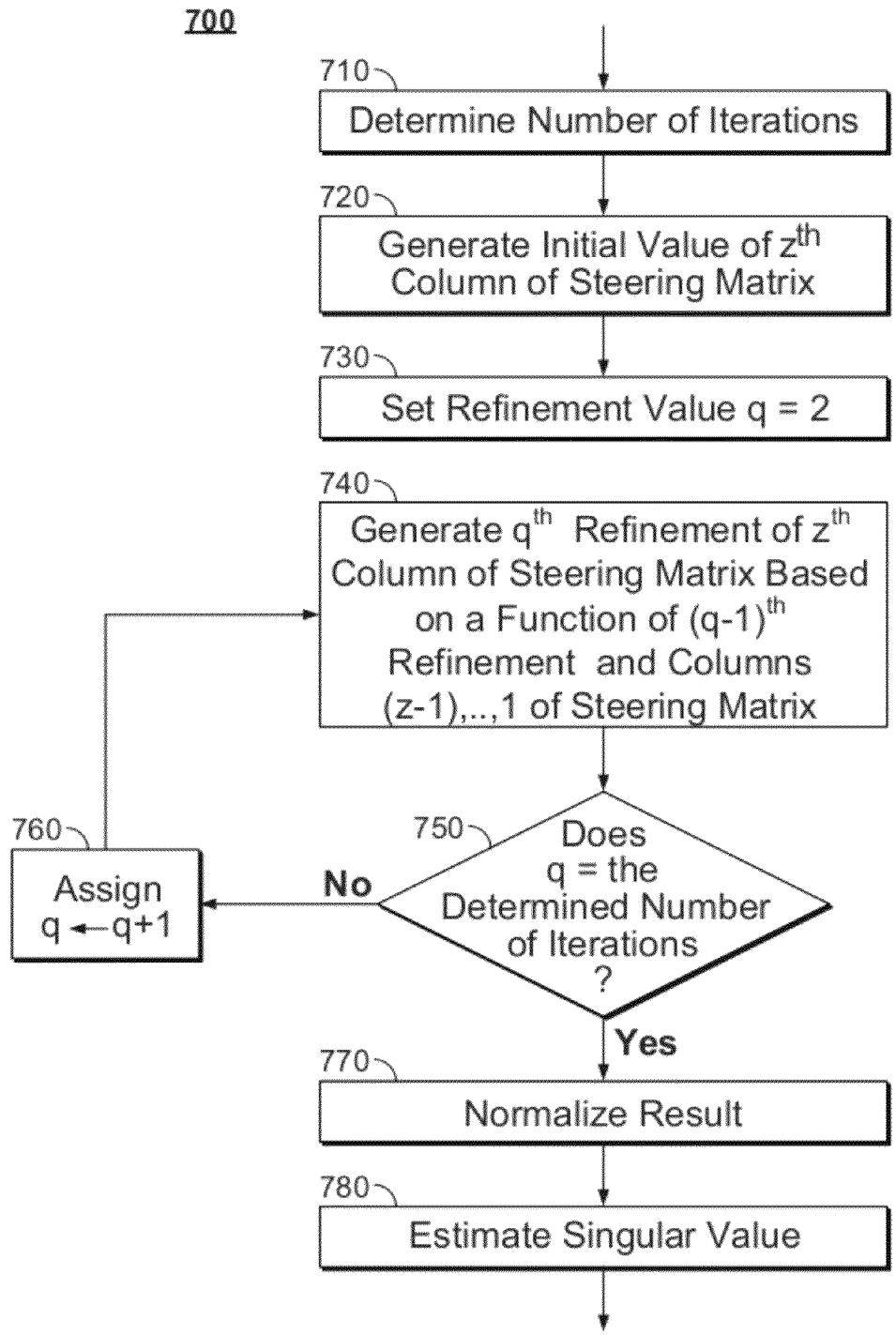
FIG. 7 illustrates a process for determining the columns of a beam-forming steering matrix other than the first column in accordance with some embodiments of the present disclosure.

At 540, process 500 generates the $z^{th}$ column of steering matrix Q 107 (FIGS. 1-3) based on the previously computed columns (z−1), ..., 1 of steering matrix Q 107 (FIGS. 1-3). That is, according to process 500, the $z^{th}$ column of steering matrix Q 107 (FIGS. 1-3) is computed based on the previously computed columns of the steering matrix. In an embodiment, process 500 performs an iterative computation at 540 using the techniques similar or identical to those described in relation to process 700 (FIG. 7).

At 550, process 500 determines if the column value z is equal to the number of spatial streams $N_{ss}$ present in the transmitter, e.g., transmitter 102 (FIGS. 1 and 3). If the column value is equal to the number of spatial streams, process 500 may return or send the computed value of the steering matrix, i.e., $$Q=[v_1\ v_2\ldots v_{N_{ss}}],$$

to process 400 at 450 (both of FIG. 4). If, on the other hand, the column value is not equal to the number of spatial streams, then process 500 may increment the column value at 560, for example, by assigning v←v+1, before returning process 500 at 540.

FIG. 6 illustrates an iterative process for determining a first column of a beam-forming steering matrix $v_1$ in accordance with some embodiments of the present disclosure. Process 600 may be implemented, for example, using process 500 at 520 (both of FIG. 5). At 610, a number of iterations to be used in refining the value of $v_1$ may be determined. The number of iterations may be determined based on time, power, and hardware constraints. In addition or alternatively, the number of iterations may be determined based on knowledge of how many iterations are typically necessary to achieve a desired level of beam-forming performance (e.g., SNR increase at receiving device 122 (FIGS. 1 and 2)).

At 620, process 600 may generate an initial (i.e., first) value for the first column of steering matrix Q 107 (FIGS. 1-3). Letting $v_1(q)$ denote the value of $v_1$ after q iterations of process 600, process 600 may set $v_1(1)$ to be a unit-vector, normalized to have unit energy, i.e., $$v_1(1)=[1,1,\ldots 1]/\sqrt{M_T}$$

at 620. Alternatively, process 600 may choose any other suitable value for $v_1(1)$.

At 630, process 600 may set the refinement value, q, equal to the value 2. The refinement value be computed and stored in hardware and/or software. The refinement value reflects the number of iterations in the computation of $v_1$ that have been computed during the operation of process 600.

At 640, process 600 may generate the $q^{th}$ refinement of $v_1$, that is, $v_1(q)$, based on a function of $v_1(q-1)$. For example, at 640, process 600 may determine $v_1(q)$ from $v_1(q-1)$ using the following update process $$v_1(q)=Rv_1(q-1),$$

where $R=H^H H$ is the channel product matrix computed, for example, at 510 of process 500 (both of FIG. 5). Alternatively, process 600 may generate $v_1(q)$ at 640 using any other suitable technique. For example, process 600 may generate $v_1(q)$ at 640 using any suitable nonlinear or non-linear transformation, and/or any suitable detection or estimation operation.

At 650, process 600 determines if the refinement value q is equal to the number of iterations determined, for example, at 610 of process 600. If the refinement value q is not equal to the number of iterations, then process 600 may increment the refinement value q at 660, for example, by assigning q←q+1, before returning process 600 at 640. On the other hand, if the refinement value q is equal to the number of iterations, process 600 may proceed to 670.

At 670, process 600 may normalize the value of $v_1$ determined via the iterative process of 600. Let $v_1(n)$ denote the final of value of the first column of steering matrix Q 107 after all iterations of process 600 have completed. In an embodiment, process 600 determines $v_1$ by normalizing $v_1(n)$ $$v_1 = \frac{v_1(n)}{\|v_1(n)\|}$$

where $\|.\|$ denotes the Euclidean norm operation.

At 680, process 600 may estimate the singular value corresponding to $v_1$ in the SVD of the channel product matrix computed, for example, using process 500 at 510 (both of FIG. 5). For example, process 600 may determine the singular value corresponding to $v_1$ according to $$\sigma_1=\|Rv_1\|.$$

Process 600 may then return or send the computed value $v_1$ and/or $\sigma_1$ the steering matrix, i.e., $$Q=[v_1\ v_2\ldots v_{N_{ss}}],$$

to process 500 at 530.

FIG. 7 illustrates a process for determining the columns of a beam-forming steering matrix other than the first column in accordance with some embodiments of the present disclosure. In particular, FIG. 7 illustrates a process for determining the $z^{th}$ column of steering matrix Q 107 (FIGS. 1-3), i.e., $v_z$, based on columns (z-1), ..., 1 of steering matrix Q 107 (FIGS. 1-3), where $2 \leq z \leq N_{ss}$. Process 700 may be implemented, for example, using process 500 at 540 (both of FIG. 5).

At 710, a number of iterations to be used in refining the value of $v_z$ may be determined. The number of iterations may be determined based on time, power, and hardware constraints. In addition or alternatively, the number of iterations may be determined based on knowledge of how many iterations are typically necessary to achieve a desired level of beam-forming performance (e.g., SNR increase at receiving device 122 (FIGS. 1 and 2)).

At 720, process 600 (FIG. 6) may generate an initial (i.e., first) value for the $z^{th}$ column of steering matrix Q 107 (FIGS. 1-3). Letting $v_z(q)$ denote the value of $v_z$ after q iterations of process 700, process 700 may set $v_z(1)$ to be a unit-vector, normalized to have unit energy, i.e., $$v_z(1)=[1,1,\ldots 1]/\sqrt{M_T}$$

at 720. Alternatively, process 700 may choose any other suitable value for $v_z(1)$.

At 730, process 700 may set the refinement value, q, equal to the value 2. The refinement value be computed and stored in hardware and/or software. The refinement value reflects the number of iterations in the computation of $v_z$ that have been computed during the operation of process 700.

At 740, process 700 may generate the $q^{th}$ refinement of $v_z$, that is, $v_z(q)$, based on a function of $v_1(q-1)$ and columns $v_z$, $v_{z-1}, \ldots, v_1$ of steering matrix Q 107. For example, at 740, process 700 may determine $v_z(q)$ from $v_z(q-1)$ and $v_{z-1}, \ldots, v_1$ using the following update process $$v_z(q)=R(I_{M_T}-S_z S_z^H)v_z(q-1),$$

where $R=H^H H$ is the channel product matrix computed, for example, at 510 of process 500, where $I_{M_T}$ is the identity matrix of dimension $M_T$ and where $S_z=[v_1,\ldots,v_{z-1}]$. Alternatively, process 700 may generate $v_z(q)$ at 740 using another suitable technique. For example, process 700 may generate $v_z(q)$ at 740 using any suitable nonlinear or non-linear transformation, and/or any suitable detection or estimation operation.

At 750, process 700 determines if the refinement value q is equal to the number of iterations determined, for example, at 710 of process 700. If the refinement value q is not equal to the number of iterations, then process 700 may increment the refinement value q at 760, for example, by assigning q←q+1, before returning to 740 of process 700. On the other hand, if the refinement value q is equal to the number of iterations, process 700 may proceed to 770.

At 770, process 700 may normalize the value of $v_z$ determined via the iterative process of 700. Let $v_z(n)$ denote the final of value of the $z^{th}$ column of the steering matrix after all iterations of process 700 have completed. In an embodiment, process 700 determines $v_z$ by first performing a final orthogonalization operation $$v_z(n) \leftarrow R(I_{MT} - S_z S_z^H) v_z(n),$$

and then normalizing to obtain $v_z$ $$v_z = \frac{v_z(n)}{\|v_z(n)\|}.$$

where $\|.\|$ denotes the Euclidean norm operation.

At 780, process 700 may estimate the singular value corresponding to $v_z$ in the SVD of the channel product matrix computed, for example, at 510 of process 500 (both of FIG. 5). For example, process 700 may determine the singular value corresponding to $v_z$ according to $$\sigma_z = \|R v_z\|.$$

Process 700 may then return or send the computed value $v_z$ and/or $\sigma_z$ and/or the value z to process 500 at 530 (both of FIG. 5).

The foregoing describes methods and apparatus for increasing the SNR and/or SIR of a received signal in a multi-stream communications system at minimal level of computational complexity using beam-forming. The above described embodiments of the present disclosure are presented for the purposes of illustration and not of limitation. The present disclosure is not limited to a particular implementation. For example, the techniques described herein could be used to determine a steering matrix separately for each tone in a multi-tone communications system including an Orthogonal Frequency Division Multiplexing (OFDM) system and an Orthogonal Frequency Division Multiple Access (OFDMA) system. Further, the techniques described herein are readily applicable to many types of transmission systems (other than multi-antenna wireless communications systems) including sonar, radar, astronomy, speech, and medical transmission systems. Further, one or more parts of techniques described above may be performed in a different order (or concurrently) and still achieve desirable results. In addition, the disclosure may be implemented in hardware, such as on an application specific integrated circuit (ASIC) or on a field-programmable gate array (FPGA). The disclosure may also be implemented in software.

What is claimed is:

1. A method for directing radiated energy from a transmitting device towards a receiving device in a multiple-antenna communications system, the method comprising:
    generating an input signal at the transmitting device, wherein the input signal has a number of symbols equal to a number of spatial streams intended for simultaneous transmission from the transmitting device towards the receiving device;
    determining a set of channel weights at the transmitting device, wherein the set of channel weights is indicative of a signal attenuation and a phase rotation induced by a transmission medium between the transmitting device and the receiving device;
    determining a set of steering weights at the transmitting device by iteratively applying a linear transform to an initial value of the steering weights to produce a final value of the steering weights, wherein the linear transform depends on the determined channel weights;
    applying the final value of the steering weights to the input signal at the transmitting device to produce a transmit signal; and
    transmitting the transmit signal from the transmitting device towards the receiving device using a number of antennas greater than or equal to the number of spatial streams.

2. The method of claim 1, wherein the set of channel weights are determined using a feedback channel from the receiving device to the transmitting device.

3. The method of claim 1, wherein the set of channel weights are determined based on the transmission of pilot signals from the transmitting device to the receiving device.

4. The method of claim 1, wherein:
    a channel matrix is generated from the determined channel weights, and
    the linear transform is the product of the value of the Hermitian of the channel matrix times the value of the channel matrix.

5. The method of claim 1, further comprising estimating at least one singular value by applying a Euclidean norm operation to i) the determined channel weights and ii) the determined steering weights.

6. The method of claim 1, wherein iteratively applying the linear transform comprises:
    determining a number of iterations;
    generating a square matrix based on the determining channel weights; and
    successively applying the square matrix to the initial value of the steering weights to determine the final value of the steering weights.

7. The method of claim 1, wherein the number of antennas is equal to the number of spatial streams.

8. The method of claim 1, wherein the final value of steering weights approximates one column from an orthogonal matrix in a singular value decomposition of a channel matrix corresponding to the determined channel weights.

9. The method of claim 1, wherein the final value of steering weights is equal to one column from an orthogonal matrix in a singular value decomposition of a channel matrix corresponding to the determined channel weights.

10. The method of claim 1, wherein the set of channel weights is further indicative of additive noise induced by the transmission medium between the transmitting device and the receiving device.

11. A multiple-antenna transmission system for increasing the signal-to-noise ratio at a receiving device, the multi-antenna transmission system comprising:
    encoder circuitry configured to encode data bits to produce an input signal;
    channel estimation circuitry configured to determine a set of channel weights, wherein the set of channel weights is indicative of a signal attenuation and a phase rotation induced by a transmission medium between the multi-antenna transmission system and the receiving device;
    pre-coding circuitry configured to:
        obtain the input signal,
        obtain the determined set of channel weights,
        determine a set of steering weights by iteratively applying a linear transform to an initial value of the steering weights to produce a final value of the steering weights, wherein the linear transform depends on the determined channel weights, and precode the input signal by applying the final value of the steering weights to the input signal to produce a transmit signal; and transmitter circuitry configured to transmit the transmit signal using multiple antennas towards the receiving device.

12. The multi-antenna transmission system of claim 11, wherein the channel estimation circuitry is further configured to determine the set of channel weights using a feedback channel from the receiving device to the multi-antenna transmission system.

13. The multi-antenna transmission system of claim 11, wherein the channel estimation circuitry is further configured to determine the set of channel weights based on the transmission of pilot signals from the multi-antenna transmission system to the receiving device.

14. The multi-antenna transmission system of claim 11, wherein the pre-coding circuitry is further configured to generate a channel matrix from the determined channel weights, and wherein the linear transform is the product of the value of the Hermitian of the channel matrix times the value of the channel matrix.

15. The multi-antenna transmission system of claim 11, wherein the pre-coding circuitry is further configured to estimate at least one singular value by applying a Euclidean norm operation to the determined channel weights and the determined steering weights.

16. The multi-antenna transmission system of claim 11, wherein the pre-coder is further configured to iteratively apply the linear transform by:

determining a number of iterations;

generating a square matrix based on the determining channel weights; and successively applying the square matrix to the initial value of the steering weights to determine the final value of the steering weights.

17. The multi-antenna transmission system of claim 11, wherein the number of antennas in the multiple antennas is equal to a number of spatial streams.

18. The multi-antenna transmission system of claim 11, wherein the final value of steering weights approximates one column from an orthogonal matrix in a singular value decomposition of a channel matrix corresponding to the determined channel weights.

19. The multi-antenna transmission system of claim 11, wherein the final value of steering weights is equal to one column from an orthogonal matrix in a singular value decomposition of a channel matrix corresponding to the determined channel weights.

20. The multi-antenna transmission system of claim 11, wherein the set of channel weights is further indicative of additive noise induced by the transmission medium between the transmitting device and the receiving device.

* * * * *